G. ZIEGLER.
PIPE COUPLING.
APPLICATION FILED AUG. 9, 1915.

1,176,261.

Patented Mar. 21, 1916.

INVENTOR
George Ziegler,
by Geyer & Popp
ATTORNEYS.

UNITED STATES PATENT OFFICE.

GEORGE ZIEGLER, OF BUFFALO, NEW YORK, ASSIGNOR TO PETER G. SIGRIST, OF BUFFALO, NEW YORK.

PIPE-COUPLING.

1,176,261.   Specification of Letters Patent.   Patented Mar. 21, 1916.

Application filed August 9, 1915. Serial No. 44,404.

*To all whom it may concern:*

Be it known that I, GEORGE ZIEGLER, a citizen of the United States, residing at Buffalo, in the county of Erie and State of New York, have invented new and useful Improvements in Pipe-Couplings, of which the following is a specification.

This invention relates to a coupling for soft-metal parts, such as lead pipes, sewer traps and bends or elbows. Its object is the production of a convenient and inexpensive coupling of this character which produces a tight and reliable joint and dispenses with wipe-joints and packings.

Figure 1:
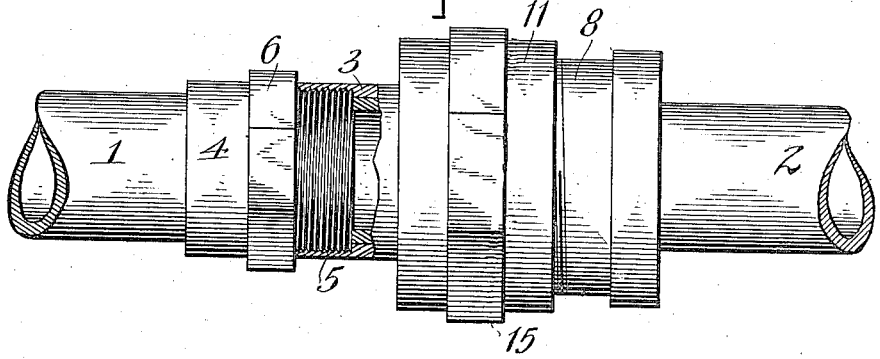
Figure 2:
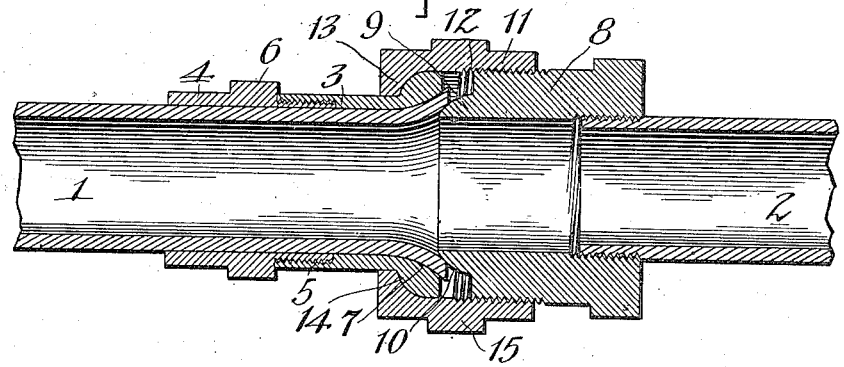
Figure 3:
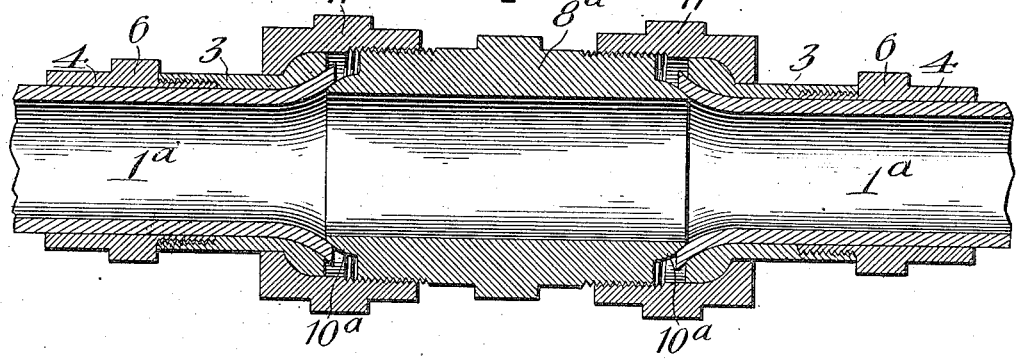

In the accompanying drawings: Figure 1 is a side elevation of the improved coupling, partly in section. Fig. 2 is a longitudinal section thereof. Fig. 3 is a longitudinal section of a modified form of the coupling.

Similar characters of reference indicate corresponding parts in the several views.

The joint shown in Figs. 1 and 2 is designed more particularly for coupling a lead or other soft metal pipe-section to an iron or other hard metal pipe-section, while the coupling illustrated in Fig. 3 is designed to couple two soft-metal sections.

Referring to Figs. 1 and 2, 1 indicates a lead or other soft-metal pipe-section and 2 a pipe-section of iron or other hard metal. Surrounding the end portion of the lead-section is a sleeve which, in its preferred form, is composed of two telescopic sections 3 and 4 connected by a screw-threaded joint 5, preferably a left-hand thread, for the purpose hereinafter described. The bore of this sleeve is provided in its front portion with a flaring seat 7, and the end of the lead-pipe 1 is dressed or flared to fit this seat, into which it is forced by a thimble 8 screwed upon the iron pipe section 2. This thimble is provided at its front end with an annular reduced portion or nipple 9 having a convex face 10 which enters the flared end of the lead-pipe. The sleeve 3, 4 and the thimble 8 are tightly drawn together by a coupling-collar 11 provided in one end of its bore with an internal screw thread 12 engaging an external thread on the thimble and having at its other end an inwardly-turned flange 13 which engages behind an external flange or shoulder 14 of the sleeve-section 3. This coupling collar has a flat-sided portion or collar 15 adapted to receive a wrench for turning it.

Upon assembling the parts, as shown in Figs. 1 and 2, and tightening the coupling collar 11, the convex nipple 9 is forced into the flared end of the lead pipe 1, compressing it between the nipple and the surrounding seat 7 of the sleeve-section 4 and forming a tight and reliable joint, which requires no packing and does away with wiped joints.

It is desirable to provide the sleeve 3—4 with a flat-sided collar 6 to receive a wrench and prevent marring of the sleeve which might otherwise occur, as plumbers are apt to grasp the sleeve to hold it from turning in tightening the coupling collar 11, although it may not be necessary to do so. In order to permit the coupling collar to be placed on said sleeve between its collar 6 and the shoulder 14, the sleeve is composed of the separable front and rear sections 3 and 4 and the rear section is provided with the collar. After passing the coupling collar 11 over the front section 3, the rear section 4 is screwed into it. To prevent these sleeve-sections from screwing apart upon tightening the coupling collar, they are preferably connected by a left-hand thread, while the coupling collar is connected with the thimble 8 by a right-hand thread, as shown.

This coupling may be employed for connecting two sections of lead or other soft metal by slightly modifying the construction of the thimble, as shown in Fig. 3. In this case, each of the lead pipe-sections 1ª is surrounded by a sectional sleeve 3, 4, and the thimble 8ª is double-ended or provided at each end with a convex nipple 10ª, which are forced into the flaring ends of the respective pipe-sections by separate coupling collars 11ª.

I claim as my invention:

1. A pipe coupling comprising a sleeve having a flaring bore adapted to receive the corresponding end of a soft-metal pipe, said sleeve consisting of separable front and rear sections, the front section having an external shoulder and the rear section having a flat-sided collar, a thimble having a nipple adapted to enter the flaring end of the soft-metal pipe, and a coupling collar engaging said thimble and the shoulder of said sleeve-section.

2. A pipe coupling comprising a sleeve having a flaring bore adapted to receive the corresponding end of a soft-metal pipe, said sleeve consisting of separable front and rear sections connected by a left-hand screw thread, the front section of said sleeve having an external shoulder and the rear section having a flat-sided collar, a thimble having a nipple adapted to enter the flaring end of the soft-metal pipe, and a coupling collar engaging the shoulder of said sleeve-section and connected with said thimble by a right-hand thread.

GEORGE ZIEGLER.